United States Patent
Amann

[19]
[11] Patent Number: 6,135,525
[45] Date of Patent: Oct. 24, 2000

[54] EXPANDABLE PORTABLE SHELTER

[76] Inventor: Robert Collins Amann, 1126 Josephine Ct., Sebring, Fla. 33872

[21] Appl. No.: 09/154,988

[22] Filed: Sep. 17, 1998

[51] Int. Cl.⁷ .................................................. B62D 27/00
[52] U.S. Cl. ................................... 296/26.11; 296/29.12; 296/164; 296/174
[58] Field of Search .................................. 296/164, 165, 296/174, 175, 26.12, 26.15, 26.03, 26.11; 280/763.1

[56] References Cited

U.S. PATENT DOCUMENTS

| | | | |
|---|---|---|---|
| 2,484,312 | 10/1949 | Rebours | 296/26.15 |
| 3,097,013 | 7/1963 | Mussler | 296/164 |
| 3,257,760 | 6/1966 | Calthorpe | 296/165 |
| 3,271,065 | 9/1966 | Scuris | 296/26.15 |
| 3,365,214 | 1/1968 | Garnett | 280/763.1 |
| 3,397,909 | 8/1968 | Gossman | 296/165 |
| 3,598,441 | 8/1971 | Damiani | 296/164 |
| 3,778,100 | 12/1973 | Dillard | 296/164 |
| 3,841,690 | 10/1974 | Piercy . | |
| 4,012,070 | 3/1977 | Mertz . | |
| 4,027,801 | 6/1977 | Johnston et al. | 280/763.1 |
| 4,049,310 | 9/1977 | Yoder . | |
| 4,057,284 | 11/1977 | Blank . | |
| 4,176,873 | 12/1979 | Barr et al. . | |
| 4,268,066 | 5/1981 | Davis | 280/763.1 |
| 4,294,484 | 10/1981 | Robertson | 296/174 |
| 4,461,490 | 7/1984 | Friel et al. | 280/763.1 |
| 4,807,924 | 2/1989 | Kottke . | |
| 5,016,935 | 5/1991 | Semple . | |
| 5,462,330 | 10/1995 | Brown | 296/174 |
| 5,547,220 | 8/1996 | Lagsdin | 280/763.1 |
| 5,560,667 | 10/1996 | Edry | 296/26.12 |
| 5,622,235 | 4/1997 | Merritt | 280/763.1 |
| 5,908,215 | 6/1999 | Hanser et al. | 296/176 |

*Primary Examiner*—Joseph D. Pape
*Assistant Examiner*—Kiran Patel
*Attorney, Agent, or Firm*—David Kiewit

[57] ABSTRACT

An expandable portable shelter that can be transported in the load bed of a truck comprises four or more elongated rectangular panels hinged together along their longer, horizontally disposed, edges and attached to over a cut-out in a sidewall of the shelter. When the shelter is collapsed for transport the panels adjacent the edges of the cut-out cover it and the other panels intrude inwards from the sidewall. To expand the shelter these panels are pushed outward to form a tubular expansion volume outboard of the truck's load bed. The ends of this rectangular tube are sealed with end-sealing panels hinged to the sidewall. The shelter can be removed from the truck's load bed after supporting the shelter on front and rear jack stands. The front jack stands have articulated legs that, when in their load-bearing positions, extend far enough outboard of the load bed that the truck can be driven out from under the structure without the truck's fenders contacting any portion of the front jack stand.

9 Claims, 7 Drawing Sheets

EXPANDABLE PORTABLE SHELTER

CROSS REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

1. Field of the Invention

The present invention provides a portable shelter that is transportable in a truck's load bed and that can be expanded laterally beyond the sides of the truck when the shelter is to be inhabited.

2. Background of the Invention

Shelter structures of the type commonly called "campers" are often designed to be transported and used when mounted in the load bed of a conventional pickup truck. The extreme popularity of pickup trucks, coupled with industry standards on load bed sizes and carrying capacity ratings, make it attractive for manufacturers to design and build campers capable of slipping into the unmodified load bed of a pickup truck. This nominally provides the consumer with a portable recreational shelter that is removable from the truck bed when the truck is to be used for other hauling jobs.

Restrictions on the maximum roadable width of a camper, imposed by motor vehicle regulations, dictate that a truck-mounted camper generally provides little space for one to move around inside the structure. People have taken a wide variety of approaches to overcoming this problem by providing collapsible and expandable camper structures that can be collapsed when driving and expanded when the truck is parked at a campsite. These expandable campers have generally been heavy and have employed awkward mechanisms that made it difficult for the owner to change between configurations.

Owners of truck-mounted campers have long been disappointed by the difficulties involved in mounting the camper in the truck bed and in subsequently removing the camper so that the truck can be used for other purposes. Many owners leave their campers mounted in their trucks permanently to avoid these difficulties, but thereby put up with reduced fuel efficiency and restricted garage access due to the added height, width and weight.

The major problem in installing a camper into a load bed is that of supporting the front end of the camper during the process. One arrangement for doing this involves supporting the unmounted camper on two jack stands at its rear and two additional jack disposed near its midpoint, and providing small wheels at the front of the camper to engage the bottom of the truck's load bed. With this arrangement, loading the camper into the truck requires backing the truck up until the small wheels have engaged its load bed, retracting the midpoint jacks and then backing up further until the camper is fully loaded. In addition to requiring a cumbersome loading procedure, this arrangement also requires that heavier objects in the camper be stowed towards the rear to keep the camper from falling forwardly when supported on the four jacks. This, of course, leads to the truck having a mal-distributed load - that is, the load on the truck is distributed toward its rear, rather than being distributed forwardly so as to place the center of load ahead of the rear axle.

Notable among the patent art in this area are the following teachings:

In U.S. Pat. No. 5,016,935, Semple discloses a camper body comprising a plurality of panels connected along their edges by flexible sheets of material acting as hinges. Semple's camper, when erected, comprises front and rear end walls having gaskets sealing these walls to the top and side portions of the structure.

In U.S. Pat. No. 4,807,924, Kottke teaches a folding camper for use in the load bed of a pickup truck. The roof of Kottke's structure comprises two panels hingedly attached along the top of the load bed and pivoting between a horizontal position (when stowed for travelling) and an erected position.

In U.S. Pat. No. 4,294,484, Robertson discloses a camper carried in a pickup truck, the camper having sleeping pallets dispo sed outboard of the truck body whenn the camper is expanded so th at substantially the entire load bed of the truck is available as floor space. Robertson's pallet Is hingedly attached along the top of the load bed and is movable between an approximately vertical position when stowed for traveling and a generally horizontal position outward of the truck body when the camper is expanded so that it can be inhabited. Robertson provides a flexible tent-lke covering over the pallet.

In U.S. Pat. No. 4,176,873, Barr et al . teach a pickup camper comprising a panel hinged along a line transverse to the truck body and g en erally running along the rearward edge of the top of the cab. This panel is disposed above and parallel to the load bed of the truck when configured for travelling, and is pivoted into a position generally above the cab and engine compartment when the camper is expanded for use. Moving the panel into the expanded camper position erects a flexible tent generally disposed over the entire length of the truck.

In U.S. Pat. No. 4,057,284, Blank teaches a collapsible cabin that may be carried in the back of a pickup truck. The walls of Blank's portable shelter comprise a plurality of elongated rectangular panels hingedly interconnected along ones of their longer edges.

In U.S. Pat. No. 4,049,310, Yoder teaches a recreational trailer having an expansible box-like section that can be translated outwardly from one sidewall of the trailer when the trailer is converted from its travelling configuration to its expanded configuration.

In U.S. Pat. No. 4,012,070, Mertz teaches an expandable camper carried in a pickup truck, the camper comprising a cap portion and two berth portions interfitted beneath the cap when the camper is configured for travel. To expand the camper for occupancy, Mertz's cap is translated vertically upwards and the two berth portions are translated laterally outwards of the truck body.

In U.S. Pat. No. 3,841,690, Piercy shows sidewall sections pivotally mounted along the sidewall panels of a pickup truck. When disposed horizontally, the sidewall sections provide a closure for the truck's load bed. When pivoted into a vertical position, the sidewall sections act as a supplemental body. Piercy shows a separate top that can be placed over the erected sidewall sections to make an enclosed camper-like body.

BRIEF SUMMARY OF THE INVENTION

An expandable portable shelter of the invention comprises four or more elongate rectangular panels hinged together along their longer, horizontally disposed, edges and attached to the edges of a fenestration in a fixed sidewall of the shelter. The expandable portable shelter is alterable between a collapsed, roadable configuration and an expanded, inhabitable configuration. In the roadable configuration those panels adjacent the edges of the fenestration are generally aligned with the sidewall and the other panels are disposed inboard thereof. In the inhabitable configuration the panels are hingedly rotated to a limiting position in which all of the panels are generally disposed outward of the sidewall. In a preferred embodiment, a pair of actuators is provided, each actuator moving a respective set of four panels between the collapsed and the expanded configurations.

In a preferred embodiment of the expandable portable shelter, two end-sealing panels are attached to the fixed sidewall adjacent the front and rear edges of the fenestration by vertical hinges, which are preferably formed from a sheet of flexible material of the type generally called a continuous plastic hinge. In the roadable configuration the end sealing panels are oriented generally parallel to the sidewall of the portable shelter and thereby parallel to the longitudinal axis of the truck's load bed. In the expanded configuration the end sealing panels are disposed generally perpendicular to the longitudinal axis of the load bed so as to abut and seal the otherwise open ends of the generally tubular structure formed by pivoting the plurality of elongated rectangular panels about their horizontal hinges, which are also preferably of the continuous plastic variety.

A jacking arrangement is provided by the invention to aid in mounting a portable shelter in a truck load bed and in demounting it therefrom. The jacking arrangement comprises a pair of jack arms pivotally attached to the portable shelter adjacent a front end thereof, each jack arm capable of being moved between a stowed position and a supporting position. In the stowed position the jack arm does not substantially extend outward of a side of the load bed. In the support position the lowermost portion of the jack arm contacts the surface of the earth far enough outboard of the truck's track so that the arm does not contact any portion of the truck when the truck is driven away from the supported portable shelter or when the truck is backed under the supported portable shelter. A preferred jacking arrangement comprises an articulated jacking arm and a hydraulic actuator for supporting each side of the portable shelter. The preferred articulated jacking arm has an upper arm portion pivotally attached at an upper end thereof to a front wall of the portable shelter, a lower arm portion pivotally attached to the upper arm portion, and a foot pivotally attached to the lower arm portion.

DETAILED DESCRIPTION OF THE INVENTION

Figure 1:
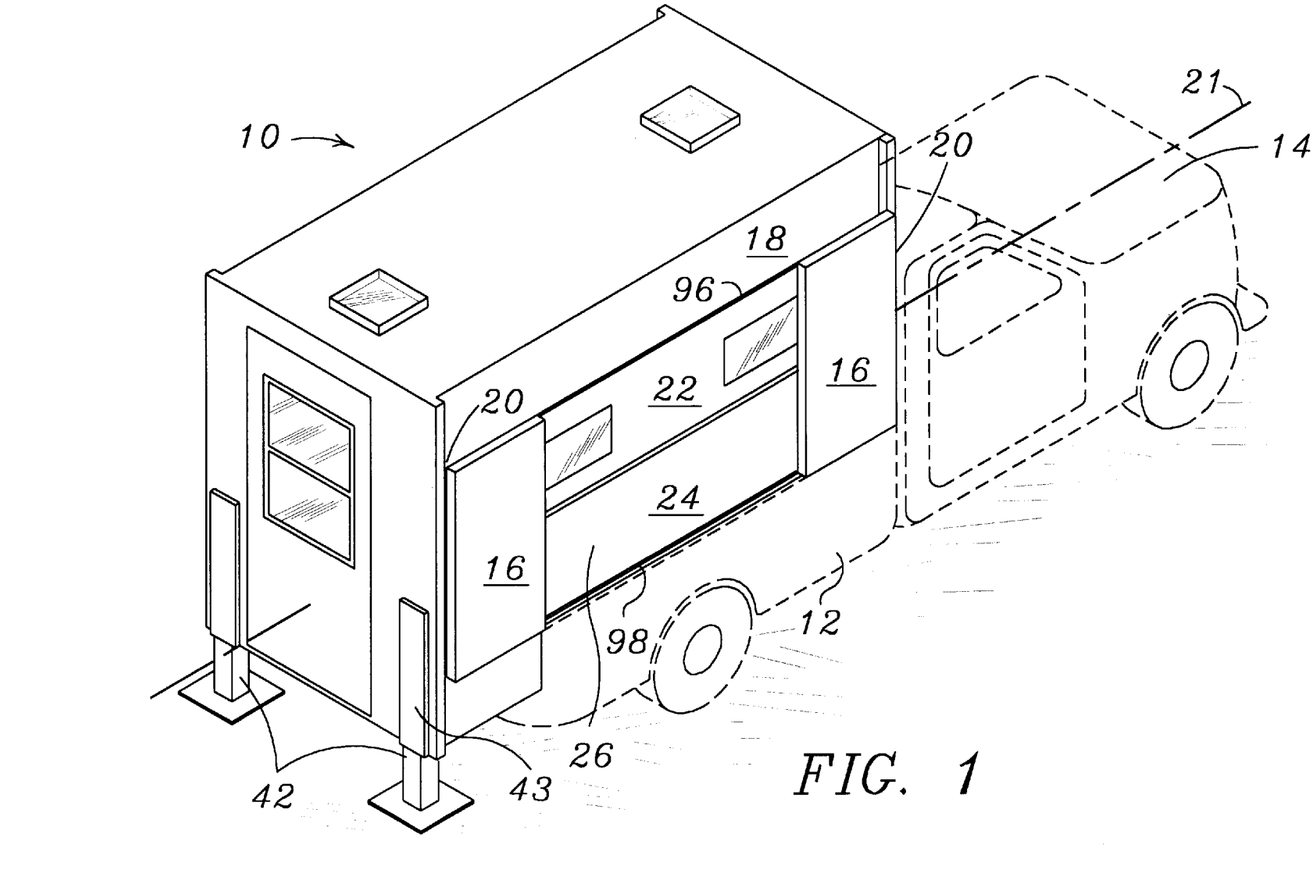
FIG. 1 is a perspective view of an expandable portable shelter of the invention mounted in a pickup truck in a collapsed configuration.

An expandable portable shelter 10 of the invention is depicted in FIG. 1 in its collapsed, roadable configuration mounted in the load bed 12 of a pickup truck 14. A pair of end sealing panels 16 are hingedly attached, preferably by means of continuous plastic hinges 15, to one of the two sidewalls 18 of the portable shelter 10 along respective vertical axes 20. The panels 16 are disposed generally parallel to the sidewall 18 and to the longitudinal axis 21 of the truck's load bed 12 when the portable shelter 10 is in this configuration. An uppermost 22 and a lowermost 24 of a set of four hingedly interconnected elongated rectangular panels 26 are visible in the collapsed configuration, while the second lowest 28 and second highest 30 of these panels 26 are disposed horizontally inside the body of the portable shelter 10.

Figure 2:
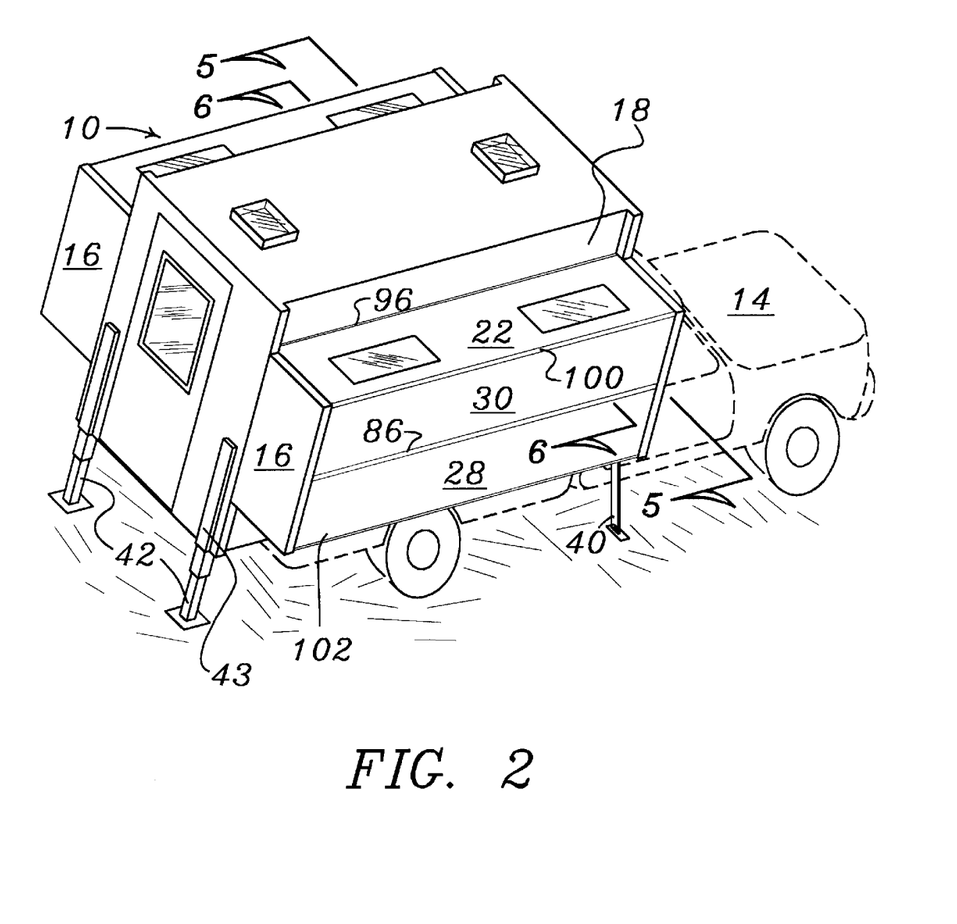
FIG. 2 is a perspective view of the portable shelter of FIG. 1 in its expanded configuration, the portable shelter supported by a plurality of jacks.

As shown in FIG. 2, when the portable shelter 10 is expanded to be occupied the end panels 16 are swung outwardly so as to be generally perpendicular to the side of the vehicle 14, and the elongated panels 26 are moved outwardly so that the uppermost 22 and lowermost 24 panels are generally horizontal while the second lowest 28 and second highest 30 panels are generally vertical. The end panels 16 then abut the short ends of the elongated panels and a gasket 33, which is preferably a compressible vinyl weather-stripping, is used to provide a weather-tight seal around the ends of the tubular extension 32. Those skilled in the art of camper construction will appreciate that other approaches could be used to close off the ends of the tubular expansion volume. These approaches include providing a flexible fabric covering attached along its periphery to the ends of the elongate panels, or providing separately carried rigid sheets configured to be clamped over the ends of the tubular volume.

Figure 3:
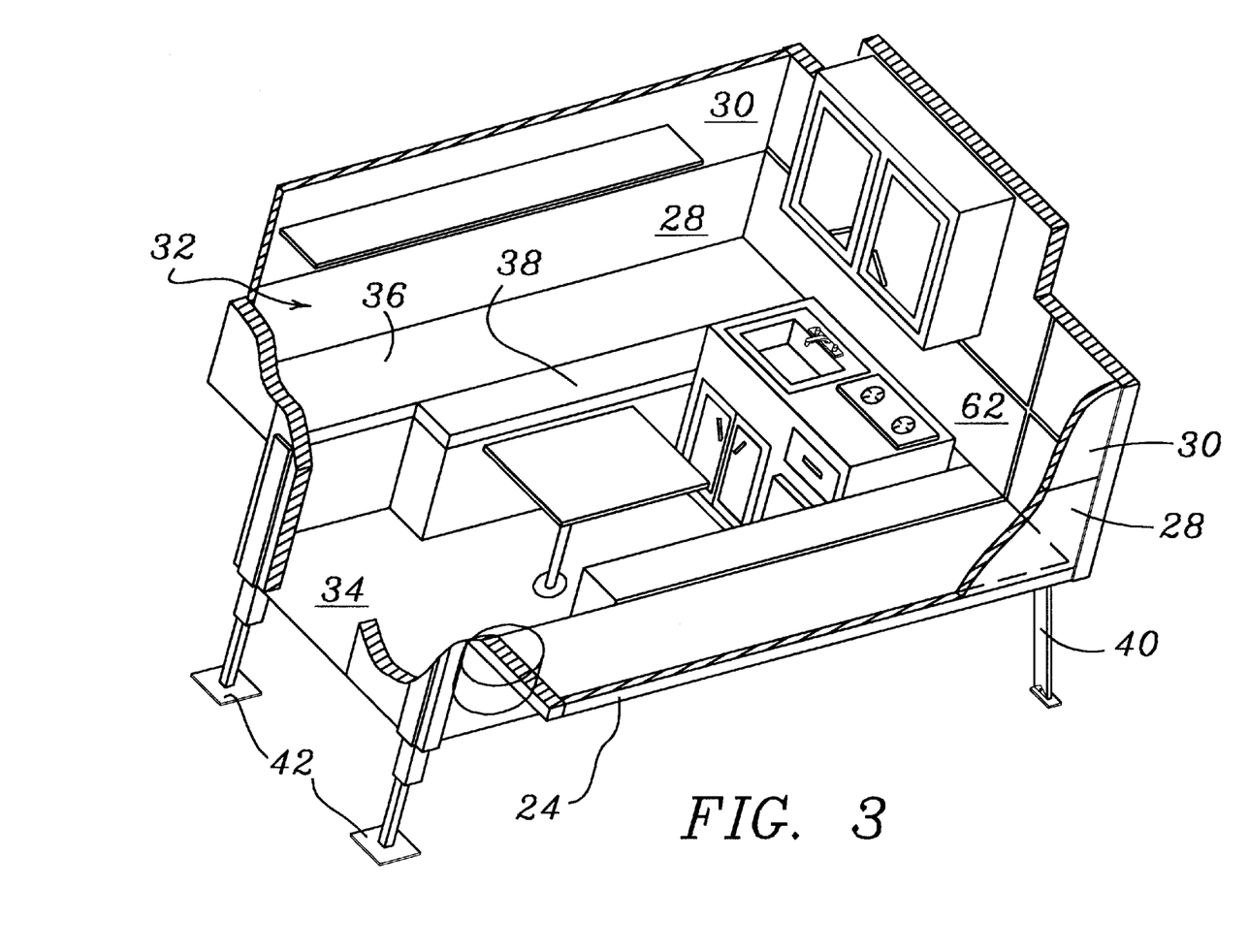
FIG. 3 is a cut-away perspective view of the portable shelter in its expanded configuration, the portable shelter supported by a plurality of jacks.
Figure 5:
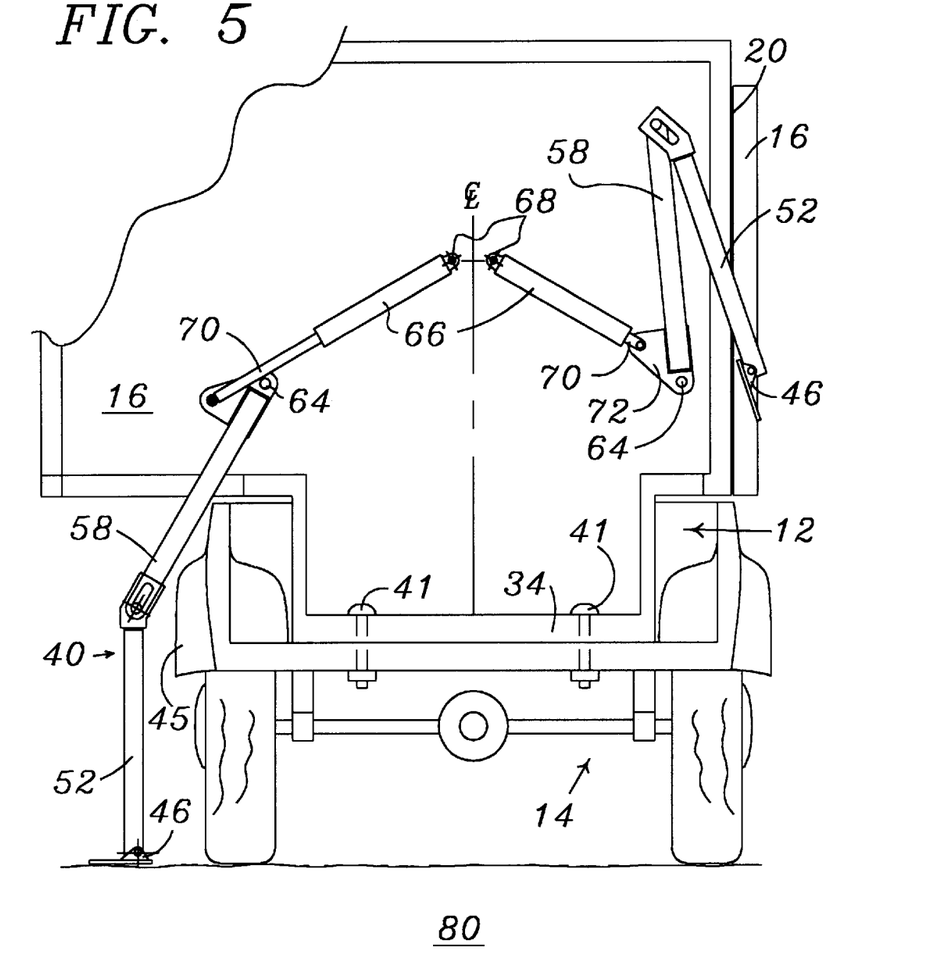
FIG. 5 is an elevational view indicated by the arrow 5—5 in FIG. 2, the view depicting the loadbearing and stowed limiting positions of a pair of articulated jack mechanisms of the invention.

As depicted in FIGS. 3 and 5, when the portable shelter is expanded it has a flat floor 34 having a minimum width approximately equal to the distance between the rear wheel wells. (In full sized pickup trucks, the distance between wheel wells is conventionally slightly more than four feet so that a sheet of plywood or gypsum wall board can be laid flat in the bed of the truck). The lowermost elongated panels 24 provide sleeping or seating pallets, and preferably have a cushion 36 attached to them. The width of the elongated side panels 26 may be selected so that the height of the tubular expansion 32 is greater than the seated height of an average adult. In one embodiment, each of the side panels 26 is twenty five inches wide. To provide additional width for sleeping, a hinged bench 38 that opens to form a double bed is preferably provided in the portable shelter.

The expanded portable shelter 10 may be supported by the truck 14 (in which case any of a variety of known and suitable load locking devices 41 can be employed to secure the shelter 10 to the load bed 12), or the shelter 10 may be supported by front 40 and rear 42 jack stands. The rear jack stands 42 are preferably hydraulically operated, but may be operated by other means, such as a crank arm driving a pinion gear along a rack. Fixed outer tube portions 43 of the rear jack stands 42 are preferably part of the structural frame of the shelter 10. The front jack stands 40 are more unusual in that they are designed so that all portions of the jack stand extending below the top of the load bed 12 are spaced outwardly far enough so that whenever the front 40 and rear 42 jack stands are in their weight-bearing positions and the portable shelter 10 has been lifted off the load bed 12, the truck 14 may be driven out from under the portable shelter 10 without having any part of the truck (e.g., a fender 45) hit any part of a jack stand 40. In a preferred embodiment, the front jack stands 40 are configured so that even a truck with dual-width fenders can drive out from beneath the shelter without hitting a leg 44.

Figure 4:
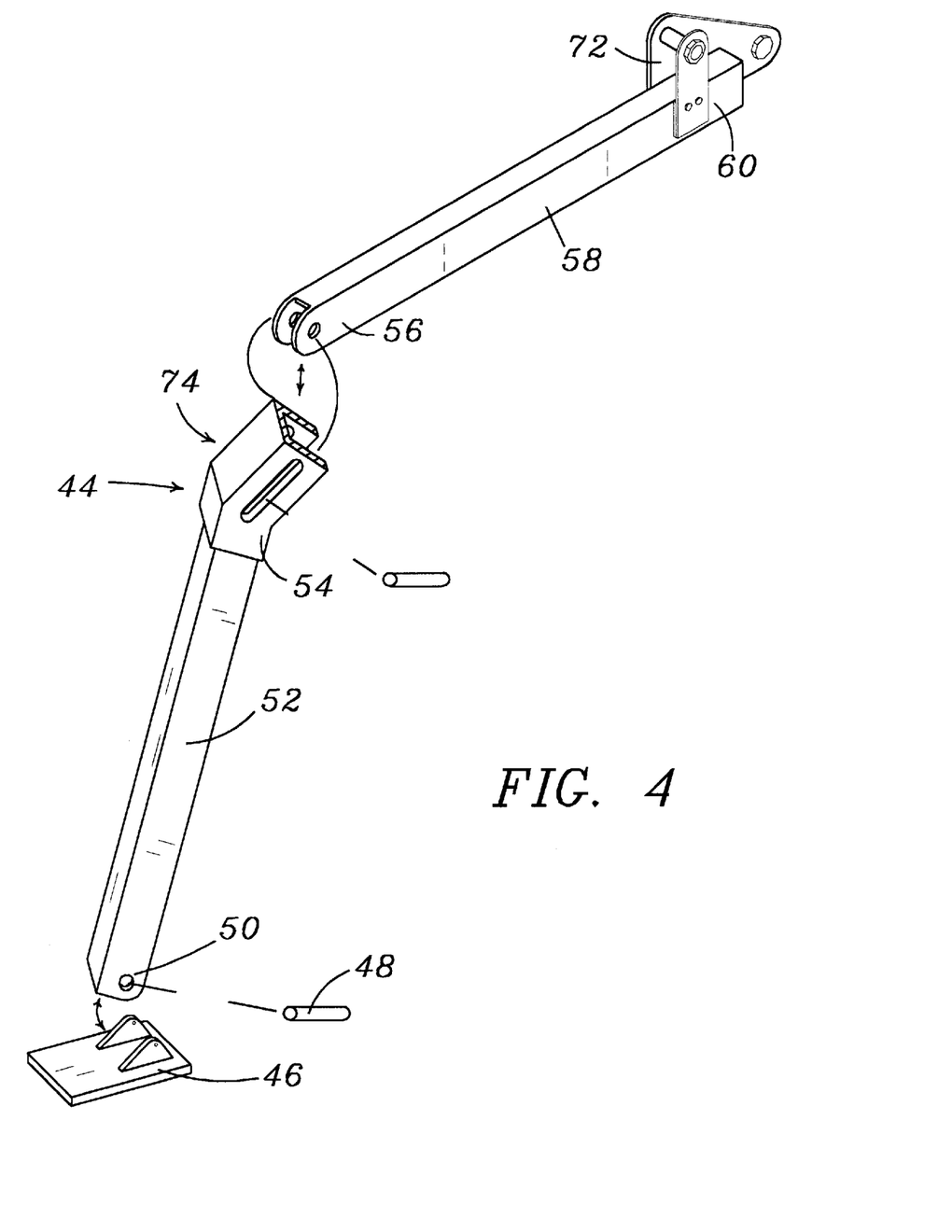
FIG. 4 is an exploded view of a preferred articulated front jack arm.

A preferred front jack stand 40 comprises an articulated leg 44 comprising a foot 46 pivotally attached (e.g., by means of a pin 48) to a lower end 50 of a lower leg member 52. The upper end 54 of the lower leg member 52 is, in turn, pivotally attached to the distal end 56 of an upper leg member 58. The proximal, driven end 60 of the upper leg member 58 is pivotally attached to a fixed forward wall 62 of the portable shelter 10 that extends transversely across the load bed 12. The pivotal attachment 64 preferably provides a pivot axis parallel to the longitudinal axis of the truck 14 and disposed generally above an edge of the load bed 12. A linear hydraulic actuator 66 having a proximal end 68 pivotally attached to the wall 62 adjacent the center of the load bed and a distal end 70 pivotally attached to the upper leg member 58 ( e.g., by means of a crank portion 72 of the upper arm 58) is preferably used to drive the articulated leg 44 between a stowed and a load bearing position.

In the stowed position, as depicted on the right hand side of FIG. 5, the hydraulic actuator 66 draws the leg 44 upwards and inwards of the truck body so as to minimize any lateral protrusion of a portion of the leg 44 beyond the side of the truck 14 and to thereby keep all portions of the leg 44 within maximum roadable width limitations. Moreover, in the stowed position, no portion of the articulated leg 44 extends above the top of the shelter. In the load bearing position, as depicted on the left hand side of FIG. 5, the foot 46 is pivoted into a position wherein it engages the surface on which the truck is parked 80 outboard of the greatest lateral extent of the truck 14. The leg 44 is designed so that when it is in the load bearing position, all portions of the leg 44 that are disposed below the top of the load bed 12 are outboard of any portion of the truck located at corresponding heights. Because of this feature, the truck 14 can be driven forward from beneath the portable shelter 10 once the jack stands 40, 42 have been used to lift the portable shelter 10 off the load bed 12. Conversely, the portable shelter 10 can be easily emplaced in the load bed 12 of a truck 14 by raising the portable shelter high enough above the surface of the earth 80, backing the truck 14 beneath the shelter, and then lowering the shelter 10 so that it is supported by the truck 14 rather than by the jack stands 40, 42.

It will be understood to those skilled in the art that although a preferred front jack stand 40 comprises an articulated leg operated by a linear hydraulic actuator, many other combinations could be employed. One could, for example, use a winch and cable arrangement (not shown) instead of the hydraulic actuator. One could also consider the use of a non-articulated leg lacking the slotted knee joint 74 of the preferred embodiment. A non-articulated leg of this sort is believed to be less desirable because its foot portion would extend above the roof line of the shelter when retracted, it would require a wider swath of ground when bearing a load, and it would impose a greater mechanical stress on the pivotal mounting because of the longer lever arm associated with a non-articulated design.

Figure 6:
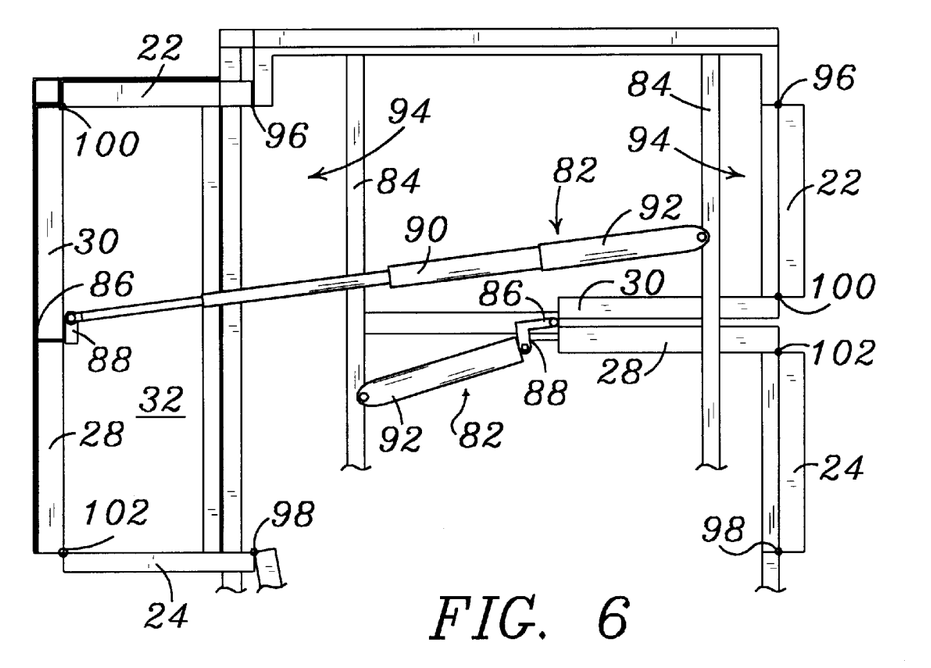
FIG. 6 is a cross-sectional view taken as indicated by the double headed arrow 6—6 in FIG. 2, the view depicting preferred actuators attached to the front wall of the shelter for expanding it.
Figure 7:
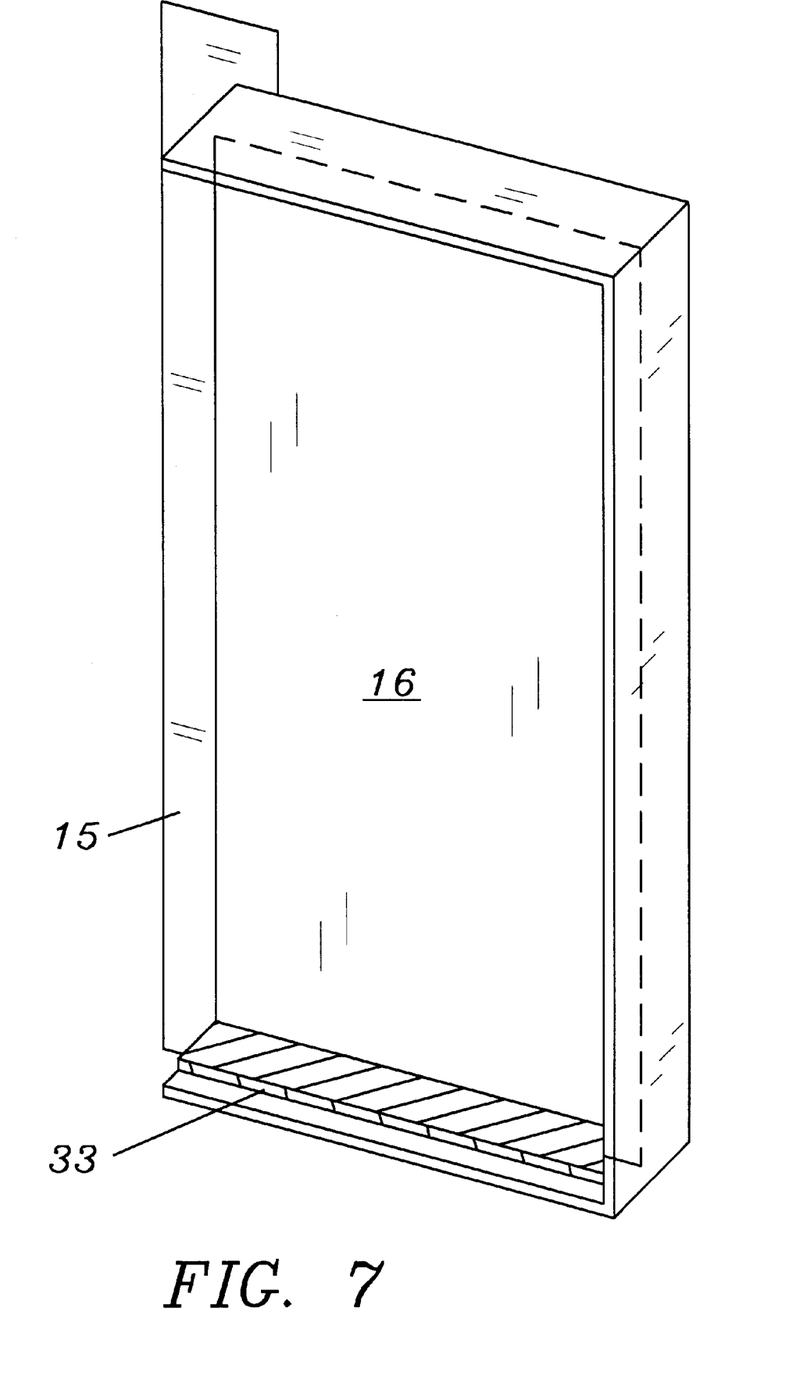
FIG. 7 is an elevational view of one of the end sealing panels.

Turning now to FIG. 6, one finds a depiction of a preferred arrangement for moving the elongated side panels 26 between the expanded configuration (shown on the left hand side of FIG. 6) and the collapsed configuration (shown on the right hand side of FIG. 6). It may be noted that although FIG. 6 shows an expanded configuration on one side and a collapsed configuration on the other, this depiction is chosen for clarity of presentation only. In the preferred arrangement both sides would be operated simultaneously.

In a preferred arrangement for expanding and collapsing the portable shelter 10 a hydraulic cylinder 82 is connected between a fixed support 84 on the portable shelter body and the center hinge 86 of the array of side panels 26. As depicted in FIG. 6, this may be done pivotally attaching one end of the hydraulic actuator 82 to the fixed support and by pivotally attaching the other end to a link member 88 that is pivotally attached to the centerline of the continuous plastic center hinge 86. In the collapsed configuration, as depicted on the right hand side of FIG. 6, the piston 90 of the hydraulic actuator 82 is fully withdrawn into the cylinder 92 so that the two central side panels 28, 30 are drawn within the body of the portable shelter 10 and the upper 22 and lower 24 side panels, which are respectively hingedly connected to the upper and lower edges of a fenestration 94 in a sidewall 18 of the portable shelter 10 by means of uppermost 96 and lowermost 98 hinges, are drawn into a vertical orientation. To expand the portable shelter 10, hydraulic fluid is pumped through an appropriate and known arrangement of hoses and valves (not shown) into the hydraulic actuators 82, thus causing the piston 90 to push the central hinge 86 outward of the center of the portable shelter 10 so that the panels 26 pivot about the center 86, uppermost 96, lowermost 98, upper intermediate 100 and lower intermediate 102 hinges until the expanded configuration depicted on the left hand side of FIG. 6 is attained. In this expanded configuration a tubular expansion volume 32 is defined by the vertically oriented intermediate panels 28, 30 and by the horizontally oriented uppermost 22 and lowermost 24 panels. The preferred embodiment employs a conventional hydraulic pump driven by a twelve volt DC motor to pump fluid into or out of the depicted three stage hydraulic cylinders.

Although the preferred embodiment employs hydraulic actuators 82 having telescoping pistons, it will be understood by those skilled in the art that other arrangements may be used to expand and collapse the portable shelters. Such arrangements could include an electric motor driving a winch connected to an appropriate array of cables (not shown). Moreover, although the discussion and depiction of the preferred embodiment describes an expandable portion of a portable shelter comprising four elongated side panels 26 having the same width, it will be recognized that other numbers of panels could be used.

Although the present invention has been described with respect to a preferred embodiments, many modifications and alterations in addition to those specifically described supra can be made without departing from the invention. Accordingly, it is intended that all such modifications and alterations be considered as within the spirit and scope of the invention as defined in the attached claims.

I claim:

1. In a shelter transportable in a load bed of a truck, the shelter having a front wall, a rear wall and a side wall extending therebetween, the shelter adjustable between a collapsed, roadable configrmation and an expanded, inhabittable configgration, an improvement comprising a tubular expansion volume defined by four elongate rectangular panels, comprising a lowermost panel, a second lowest panel, a second highest panel and an uppermost panel, each of the panels having two elongate edges extending horizontally and parallel to the sidewall, wherein:

the lowermost panel is hingedly attached, by means of a lowermost hinge, along one of its elongate edges to a bottom edge of a fenestration in the sidewall, and the lowermost panel is hingedly attached along the second of its elongate edges to a first elongate edge of the second lowest panel by means of a lower intermediate hinge the second lowest panel is hingedly attached along the second of its elongate edges, by means of a center hinge to a first elongate edge of the second highest panel;

the second highest panel is hingedly attached along its second elongate edge, by means of an upper intermediate hinge to a first elongate edge of the uppermost panel; and the uppermost panel is hingedly attached along its second elongate edge, by means of an uppermost hinge, to a top edge of the fenestration.

2. The shelter of claim 1 wherein all of the rectangular panels have substantially the same length and wherein each of the panel extends between a front edge of the fenestration and a rear edge of the fenestration.

3. The shelter of claim 1 further comprising two end panels hingedly attached to the sidewall along vertical axes adjacent a front and a rear edge of the fenestration respectively, each of the end panels disposed substantially parallel to the sidewall when the shelter is in the roadable configuration, each of the end panels adapted to abut a respective end of the tubular volume defined by the four elongate rectangular panels when the shelter is in the expanded configuration.

4. the shelter of claim 1 further comprising a second sidewall having a second tubular expansion volume associated therewith, the second tubular expansion volume defined by a second set of four elongate panels attached to each other and to a second fenestration in the second sidewall in the same manner as the first four elongate panels are attached to each other and to the first fenestration in the first sidewall.

5. In a shelter transportable in a load bed of a truck, the shelter having a body comprising a front walls a rear wall and a sidewall extending therebetween, the shelter adjustable between a collapsed, roadable configuration and an expanded, inhabitable configuration, an improvement comprising a tubular expansion volume defined by four elongate rectangular panels, comprising a lowermost panel, a second lowest panel, a second highest panel and an uppermost panel, each of the panels having two elongate edges extending horizontally and parallel to the sidewall, wherein:

the lowermost panel is hingedly attached, by means of a lowermost hinge, along one of its elongate edges to a bottom edges of a fenestration in the sidewall, the lowermost panel is also hingedly attached along the second of its elongate edges to a first elongate edge of the second lowest panel by means of a lower intermediate hinge;

the second lowest panel is hingedly attached along the second of its elongate edges, by means of a center hinge, to a first elongate dgie of the second highest panel;

the second highest panel is hingedly attached along its second elongate edge by means of an upper intermediate hinge, to a first elongate edges of the uppermost panel; and the uppermost panel is hingedly attached along its second elongate edge, by means of an uppermost hinge, to a top edge of the fenestration;

the shelter further comprising a hydraulic actuator having a first end pivotally attached to a fixed support on the body of the portable shelter, the actuator having a second end pivotally connected to the center hinge.

6. In a shelter adapted to be transported in a load bed of a truck, the truck comprising fenders extending respectively outward of either side of the load bed, the shelter having a front wall, a rear wall and a pair of sidewalls extending therebetween, the shelter adapted to be supported on a plurality of jack stands when removed from the load bed, the plurality of jack stands comprising a rear jack stand adjacent the rear wall and a pair of front jack stands adjacent the front wall, the front jack stands characterized in that each front jack stand comprises a leg adjacent a respective side of the load bed and an actuator adapted to move the leg between a load bearing position and a stowed position, wherein that portion of each leg extending below a top of that fender that is adjacent the same side of the load bed is outboard of that fender when the leg is in its load bearing position, and no portion of either leg extends outward of a maximum roadable width when the leg is in its stowed position.

7. The front jack stand of claim 6 wherein each leg is an articulated leg having a lower leg member hingedly connected to an upper leg member, the upper leg member having a driven end pivotally attached to the front wall of the shelter for pivotal motion about an axis parallel to the longitudinal axis of the truck, and wherein the actuator comprises means for pivoting the upper leg member about the axis.

8. The improved front jack stand of claim 7 wherein the actuator is a hydraulic actuator.

9. A method of removing a shelter having a collapsed, roadable state and an expanded, inhabitable state from a load bed of a truck, the load bed having two sides and the truck having a respective fender extending outward from each side of the load bed, when the shelter is in the expanded state and the truck is disposed at a predetermined location on a surface, the method comprising the steps of a) lowering a rear jack stand disposed adjacent a rear wall of the shelter so that all but a portion of the weight of the shelter is supported thereon;

b) moving, by means of a respective actuator, a movable leg portion of each of a pair of front jack stands disposed adjacent respective sides of the load bed from a respective stowed position in which no portion of either jack stand extends laterally beyond a predetermined roadable width or vertically above a predetermined roadable height, to a load bearing position in which a lowest portion of each front jack stand engages the surface and in which all portions of each jack stand extending below a top of that fender disposed on the same side of the load bed extend outward of that fender, and wherein the portion of the weight of the shelter is supported by the pair of front jack stands in their respective load bearing positions; and c) driving the truck forward.

* * * * *

UNITED STATES PATENT AND TRADEMARK OFFICE
CERTIFICATE OF CORRECTION

PATENT NO. : 6,135,525

DATED : November 24, 2000

INVENTOR(S) : Amann

It is certified that error appears in the above-identified patent and that said Letters Patent is hereby corrected as shown below:

In Claim 1, at lines 65 and 66 of column 6, "configrmation" and "configgration", respectively, should both be replaced with -- configuration --.

In Claim 4, at line 36 of column 7, the first word "the" should be capitalized.

In Claim 5, at line 43 of column 7, after "comprising a front", "walls" should be replaced with -- wall, -- Continuing in the same Claim, at line 55 "bottom edges" should be rendered in the singular. Further in Claim 5 at line 62 "dgie" should be replaced with -- edge --. Still further in the same claim, at line 66, "first elongate edges" should be rendered in the singular.

Signed and Sealed this

Eighth Day of May, 2001

Attest:

NICHOLAS P. GODICI

Attesting Officer

Acting Director of the United States Patent and Trademark Office